INVENTOR.
NORMAN J. REGNIER
BY [signature]
HIS ATTORNEY

Feb. 20, 1962 N. J. REGNIER 3,022,477

BROAD BAND RADIO RECEIVER PRESELECTOR APPARATUS

Filed June 18, 1958 3 Sheets-Sheet 2

INVENTOR.
NORMAN J. REGNIER
BY Bruce G. Buchanan
HIS ATTORNEY

BROAD BAND RADIO RECEIVER PRESELECTOR APPARATUS

Filed June 18, 1958 3 Sheets-Sheet 3

*INVENTOR.*
NORMAN J. REGNIER
BY Bruno ... [signature]
HIS ATTORNEY

3,022,477
BROAD BAND RADIO RECEIVER PRESELECTOR APPARATUS

Norman J. Regnier, Los Angeles, Calif., assignor to Hoffman Electronics Corporation, a corporation of California Filed June 18, 1958, Ser. No. 742,961
5 Claims. (Cl. 334—77)

This is a continuation in part of application Serial No. 489,198, filed in the name of the same inventor on February 18, 1955, now abandoned.

This invention is related to the front-end portion of a broad band radio receiver and, more particularly, to an improved radio receiver preselector apparatus which will exhibit physical compactness and avoid expensive mechanical linkages.

In the past, many attempts have been made to design suitable preselector stage apparatus for employment in broad band, permeability tuned radio receivers. Invariably, certain difficulties are encountered which render preselector apparatus designs currently in use deficient in some respects. The principal difficulties lie in the fact that current preselector apparatus is physically large and bulky and also incorporates expensive mechanical linkages.

Therefore, it is an object of the present invention to provide an improved radio receiver preselector apparatus.

It is a further object of the present invention to provide an improved radio receiver preselector apparatus which will lend itself to physical compactness, low-cost manufacture, and optimum performance.

According to the present invention, a broad band radio receiver preselector apparatus employs a given number of coil pluralities each of which consists of a separate plurality of coaxially aligned, permeability tuned coils. A corresponding plurality of multi-segment tuning rods (one tuning rod for each coil plurality) is cam driven to provide for the identical relative positioning of each tuning rod with respect to corresponding coils of each coil plurality. Also, a relatively simple band-switch mechanism provides for the simultaneous selection of corresponding coils, and their associated circuitries, of each coil plurality.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
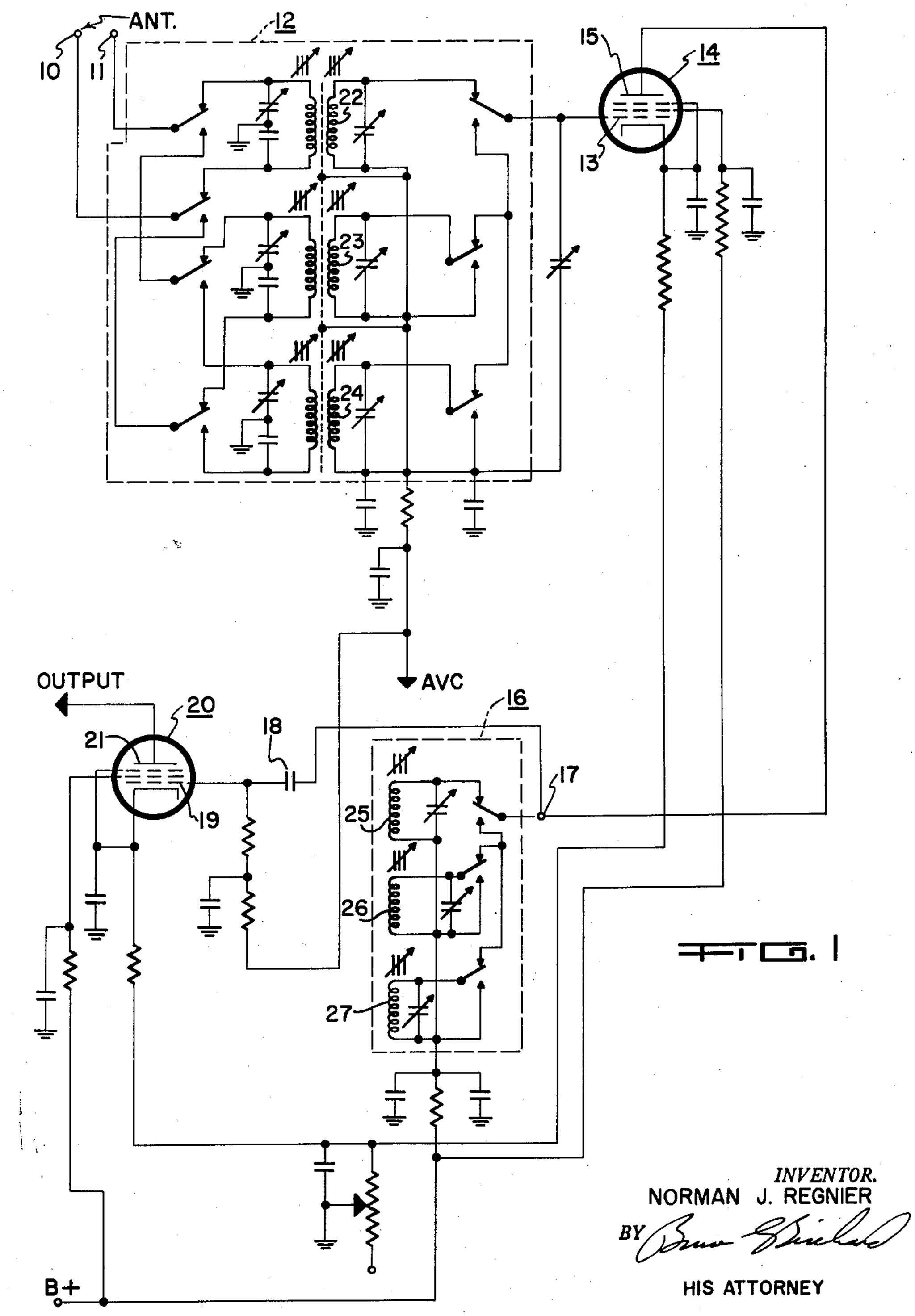
FIGURE 1 is a schematic diagram of a broad band receiver preselector circuit according to the present invention.

In FIGURE 1, antenna terminals 10 and 11 are connected to the input circuit of inductance switching unit 12. The output circuit of inductance switching unit 12 is coupled to control electrode 13 of preselector vacuum tube 14. Anode 15 of vacuum tube 14 is connected to the input circuit of inductance switching unit 16. Terminal 17, associated with inductance switching unit 16, is connected through coupling capacitor 18 to control electrode 19 of R-F vacuum tube 20. Anode 21 of vacuum tube 20 is coupled to the following preselector stages and mixer (not shown).

The circuit shown in FIGURE 1 operates as follows. An incoming signal received at antenna terminals 10 and 11 is selected by a chosen, highly selective, tunable, parallel resonant circuit including either transformer 22, 23 or 24 and is subsequently fed to control electrode 13 of vacuum tube 14. The output signal from vacuum tube 14 is taken from anode 15 and is fed to a chosen, highly selective, tunable, parallel resonant circuit including either inductor 25, 26 or 27, respectively. The signal developed across the chosen parallel resonant circuit is subsequently fed through coupling capacitor 18 to control electrode 19 of vacuum tube 20. It is to be noted that the parallel resonant circuits including transformers 22, 23 and 24 and inductors 25, 26 and 27 are permeability tuned. The variable feature of the capacitors associated therewith is solely for alignment purposes. The problem presented by the circuit of FIGURE 1 is to design suitable inductance switching units 12 and 16 so that corresponding tuned circuits may be simultaneously selected and also simultaneously tuned. A design suitable for antenna inductance switching unit 12 is illustrated by inductance unit 200, shown in FIGURE 2.

Figure 2:
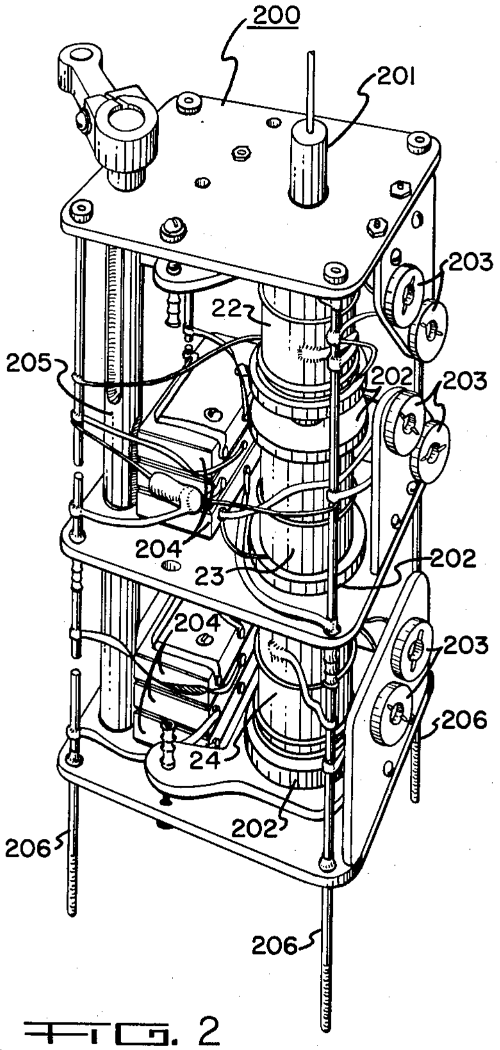
FIGURE 2 is an elevational view of an antenna inductance switching unit according to the present invention.

In FIGURE 2, transformers 22, 23 and 24 are shown coaxially aligned and tuned by a single permeability tuning rod 201 (hereinafter described in detail). Powdered iron washers 202 isolate each transformer from the remaining transformers and also from other possible sources of ambient electro-magnetic disturbances. Variable capacitors 203 shunt their respective transformer winding to form the subject paralell resonant circuits. Selective switching may be accomplished by the appropriate stacking of microswitches 204 and the cooperation of grooved switching rod 205 with the buttons of microswitches 204. Mounting elements 206 conveniently serve as input and output leads.

Figure 3:
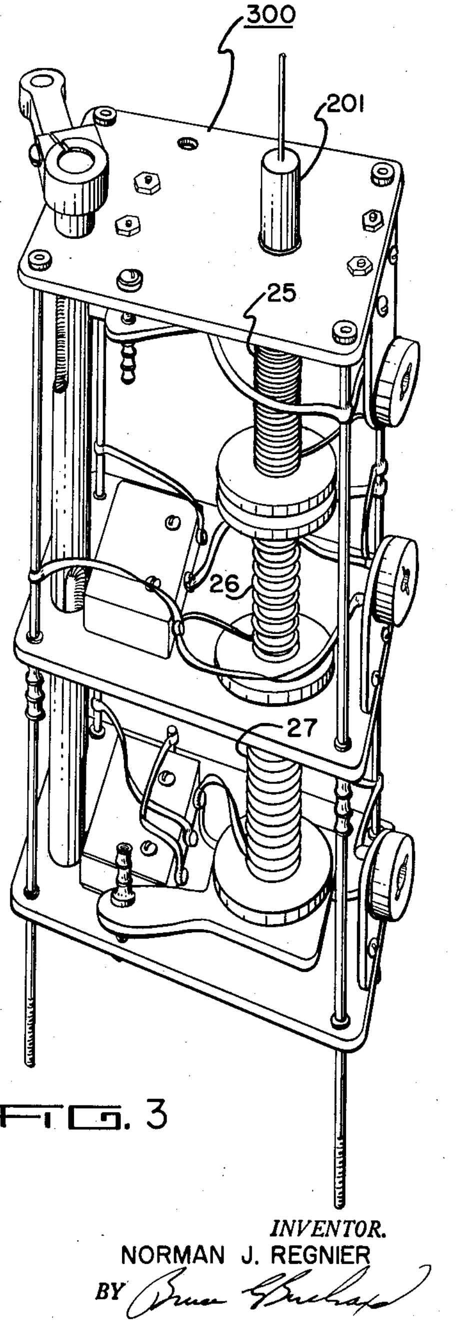
FIGURE 3 is an elevational view of an R-F amplifier inductance switching unit according to the present invention.

In FIGURE 3, inductance switching unit 300 is identical with antenna inductance switching unit 200 of FIGURE 2 with the exception that transformers 22, 23 and 24 are replaced by inductors 25, 26 and 27, respectively, and, of course, the quantities of microswitches and alignment capacitors are reduced. Inductor tuning rods 201 of FIGURES 2 and 3, the composition of which is shown in FIGURE 4, deserve special attention.

Figure 4:
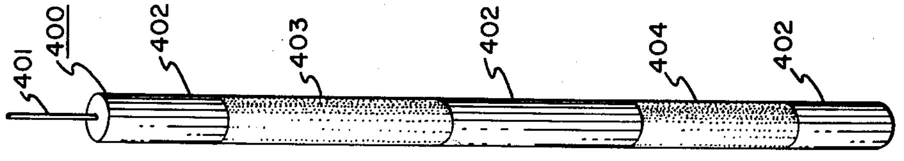
FIGURE 4 is an elevational view of a multi-segment tuning rod according to the present invention.

In FIGURE 4 tuning rod 400 (identical with tuning rods 201 of FIGURES 2 and 3) consists of guide wire 401, non-magnetic isolating elements 402, and tuning slugs 403 and 404. The number of tuning slugs chosen for incorporation in tuning rod 400 is arbitrary. In the present case it has been found convenient to employ two tuning slugs, the lower slug (slug 404) being used to tune the lower and central transformers or inductors and the higher tuning slug (tuning slug 403) to tune the upper transformer or inductor. It is important, however, to design the tuning rods so that there will be presented simultaneously to the associated coils a maximum magnetic circuit path for coil flux of one coil and a minimum magnetic circuit path for coil flux of a second coil. The reason for this requirement is apparent when it is recalled that a maximum magnetic circuit path for coil flux of a coil will increase the coil's inductance to a maximum and will reduce to a minimum the resonant frequency of a parallel resonant circuit which includes the aforementioned coil. Correspondingly, a minimum magnetic circuit path for coil flux of a second coil will reduce that coil's inductance to a minimum, and, accordingly, the resonant frequency of a parallel resonant circuit which includes the latter coil will be at a maximum. Thus, when the operator tunes to the high frequency end of one band and thereupon switches to a higher band, the receiver will already be tuned to the lowest frequency of the higher band. The great desirability of such a feature of frequency continuity is self-evident. For three frequency bands, it has been found practical to employ tuning rods each having a lower and an upper tuning slug (see FIGURE 4), the lower slug tuning the bottom two coils and the upper slug tuning the upper coil. For example only, and not in an otherwise limiting sense, the positionally uppermost co l may be assumed to be the coil for the low frequency band, the middle coil for the middle frequency band, and the positionally lowest coil for the high frequency band. Then, when the upper slug is caused to progress downwardly and outwardly from the lowest frequency position within the uppermost coil, the lower slug is progress vely inserted into the middle frequency coil for increased inductance thereof; and, accordingly, the progressive ejection of the lower tuning slug in a downwardly direction will progressively decrease the inductance of the middle frequency coil and increase the inductance of the lowest frequency coil. Hence, band switching at the high frequency end of one band will tune the receiver automatically to the lowest frequency of the next higher band in order of frequency.

Figure 5:
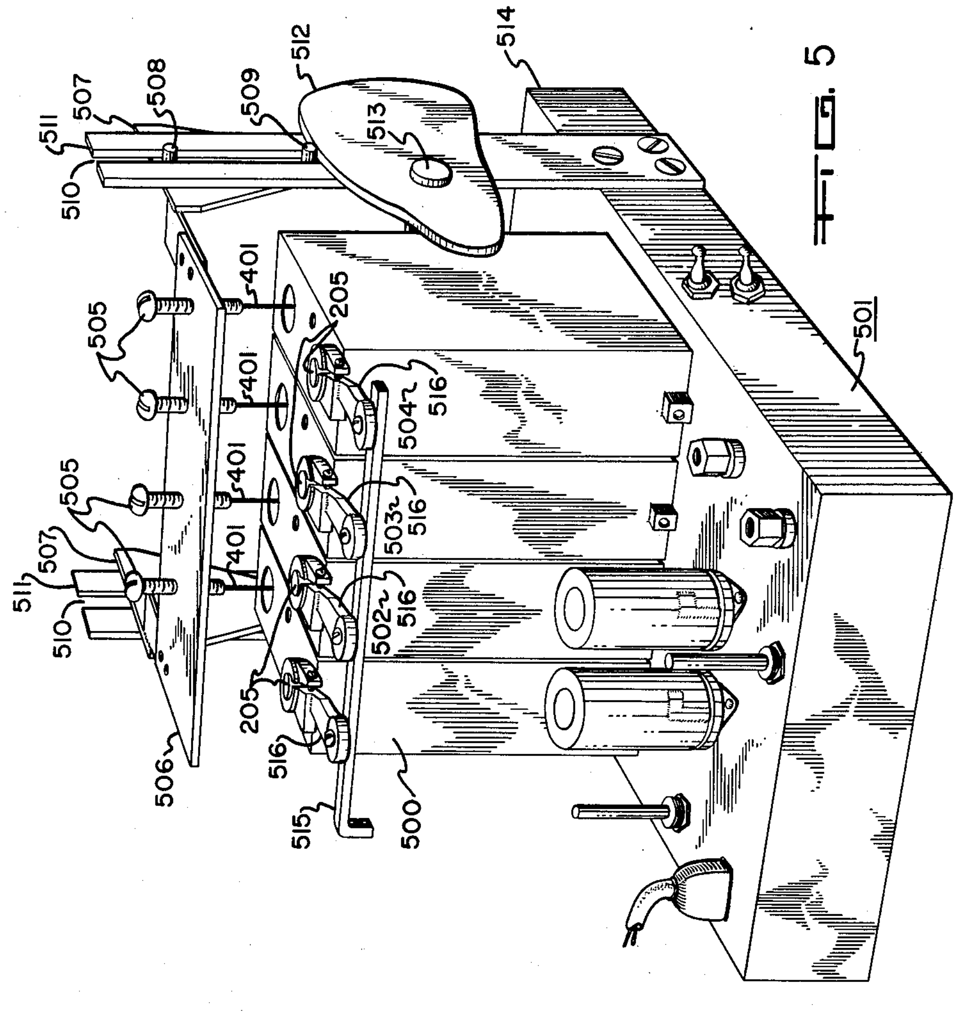
FIGURE 5 is an elevational view of a radio receiver preselector apparatus, according to the present invention.

In FIGURE 5 metallic housing 500 of receiver front-end 501 encloses antenna inductance switching unit 200 of FIGURE 2. Metallic housings 502, 503 and 504 enclose inductance sw tching units 300 as shown in FIGURE 3. Guide wires 401 from each of four permeability tuning rods 400 (not shown) are affixed to alignment screws 505 which are threaded through securing element 506. Securing element 506 is affixed to brackets 507 each having guide pin 508 and cam follower pin 509. Pins 508 and 509 slide up and down slots 510 of metal upright elements 511 in accordance with rotation of cam 512 about the axis of rod 513. Metal upright elements 511 are securely affixed to chassis 514 of receiver 501. Selective switching arm 515 gangs the rotation of grooved switching rods 205 (see FIGURE 2) by means of rotatable clamping arms 516 attached thereto.

The assembled receiver front-end shown in FIGURE 5 operates as follows. Band switching is accomplished by the lateral movement of sw tching arm 515. Ganged permeability tuning of the preselector stages is accomplished by the appropriate rotation of cam rod 513. It is not only possible, but very practical to design the configuration of cam 512 so that regardless of the band chosen for use the resonant frequency of the tuned circuits employed will be directly proportional to the angular rotation of cam shaft 512.

It is to be noted that the band switching apparatus is confined to the microswitch apparatus within the metallic housings 500, 502, 503, and 504 and the exteriorly disposed switching arm 515 and clamping arms 516. Hence, the otherwise necessary inclusion of the band switching apparatus in chass s 501 is avoided, thus reducing the chassis depth requirement and also precluding the effects of stray capacitance contributed by the band switching apparatus and alterations thereof for band changes. By keeping the band switching apparatus removed from the chassis, and consequently from the circuits w th which the tuning coils are to be associated, the deleterious effects of stray capacitance variations are avoided.

By virtue of its ruggedness, compactness, and by its avoidance of the employment of costly switching units, the present design of a broad band radio receiver preselector apparatus is believed to be a welcomed advance in the art.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invent on.

I claim:

1. Multiple-band tuning apparatus for radio receivers and the like, comprising a plurality of metallic shield housings each enclosing a plurality of axially aligned tuning coils adapted selectively to control the tuning of external circuits throughout several bands of frequencies, magnetic isolating means separating at least certain of the coils within each such housing to minimize inter-coil flux l nkage, a unitary core element slidably disposed within the coils of each housing and having spaced-apart mutually isolated magnetically permeable sections so positioned as to successively tune all of said coils throughout their respective frequency ranges during a single movement of sa d core element in one direction for a distance which is a fraction of the aggregate length of said coils, a common operating slide plate for all of said core elements, adjustable means connecting each core element to said slide plate for relative positional adjustments of said core elements relative to their respect ve coils, and cam mechanism for positioning said slide p'ate to simultaneously tune all of the coils in said housings.

2. Multiple-band tuning apparatus for radio receivers and the like, comprising a plurality of metallic shield housings each enclosing a plurality of axially aligned tuning coils adapted selectively to control the tuning of external circuits throughout several bands of frequencies, magnetic isolating means separating at least certain of the coils within each such housing to minimize inter-coil flux linkage, a unitary core element slidably disposed within the coils of each housing and having spaced-apart mutually isolated magnetically permeable sections so positioned as to successively tune all of said coils throughout their respective frequency ranges during a single movement of said core element in one direction for a distance which is a fraction of the aggregate length of said coils, electrical switch means within each such housing for selectively connecting each of the coils within that housing to an external circuit, a common operator for all of the switches in each such housing and extending to a common operating end of all said housings; a common operating slide plate for all of said core elements, adjustable means connecting each core element to said slide plate for relative positional adjustments of said core elements relative to their respective coils, cam mechanism for positioning said slide plate to simultaneously tune all of the coils in said housings, and means mechanically connecting all of said common switch operators for uni-control operation thereof from a position outside said housings.

3. In a radio receiver apparatus having a plurality of preselector stages including tunable inductance portions, the combination comprising, a plurality of separate shielded coil housings each enclosing a plurality of coaxially aligned coils wound upon a hollow insulating element within said housing, said coils of each of said coil pluralities being associated with independent circuits, a plurality of switching means in each of said shielded coil housings for switching into or out of the circuit each of said coils, each of said shielded housings provided with lateral separators for additional shielding and for support of said coils and switches, isolating means separating certain of the coils within said shielded coil housings to prevent inter-coil flux linkage, a plurality of permeability tuning rod means, each rod means being inserted in one of said hollow insulating elements and each rod means including a plurality of tuning slugs separated by isolating elements, said tuning slugs being positioned so that as one tuning slug is moved away from its respective coil, decreasing the inductance thereof, another tuning slug of the same rod is moved towards its respective coil, increasing the inductance thereof, so that when one of said independent circuits is tuned to the highest frequency of one tuning slug-coil combination, another one of said independent circuits is simultaneously tuned to the lowest frequency of a different tuning slug-coil combination, a lateral plate located above said shielded housings to receive the ends of said tuning rod means, means on said plate to adjust each of said tuning rods independently, means to simultaneously move all of said tuning rods in a vertical direction, said last named means including a cam, a cam follower, means for supporting said cam and said cam follower, a connecting link between said cam follower and said lateral plate whereby movement of said cam and cam follower is imparted to said lateral plate to simultaneously move in a vertical direction all of said tuning rods, a switch actuating means located in each of said shielded coil housings, a link member for each of said switch actuating means located outside said shielded housing, and an operating element connecting all of said outside link members for simultaneously actuating all of said switch actuating means.

4. The apparatus as set forth in claim 3 in which each of said switch actuating means comprises a cylindrical elongated cam.

5. The apparatus as set forth in claim 3 in which said lateral plate is supported by a plurality of slotted upright members one of which constitutes the means supporting the cam and cam follower.

References Cited in the file of this patent

UNITED STATES PATENTS

| | | |
|---|---|---|
| 2,037,883 | Crossley | Apr. 21, 1936 |
| 2,149,336 | Darnell | Mar. 7, 1939 |
| 2,177,835 | Mennerich et al. | Oct. 31, 1939 |
| 2,226,822 | Kirk | Dec. 31, 1940 |
| 2,227,038 | Schlesinger et al. | Dec. 31, 1940 |
| 2,276,617 | Kreienfeld | Mar. 17, 1942 |
| 2,528,167 | Pan | Oct. 31, 1950 |
| 2,532,051 | Behringer | Nov. 28, 1950 |
| 2,540,824 | Kolks | Feb. 6, 1951 |

FOREIGN PATENTS

| | | |
|---|---|---|
| 836,515 | Germany | Apr. 15, 1952 |